US008664917B2

(12) United States Patent
Jenkins et al.

(10) Patent No.: US 8,664,917 B2
(45) Date of Patent: Mar. 4, 2014

(54) ADAPTER AND METHOD FOR MOBILE UNIT CHARGING AND COMMUNICATION

(75) Inventors: Ian Jenkins, Stony Brook, NY (US); Hoon Lim, Bellport, NY (US); Wen-Tsia Liu, Flushing, NY (US); Richard Martin, New Hyde Park, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 681 days.

(21) Appl. No.: 12/729,382

(22) Filed: Mar. 23, 2010

(65) Prior Publication Data

US 2011/0234161 A1    Sep. 29, 2011

(51) Int. Cl.
*H02J 7/00* (2006.01)
*F21L 4/00* (2006.01)

(52) U.S. Cl.
USPC ............. 320/115; 320/114; 320/112; 310/50; 362/183

(58) Field of Classification Search
USPC ........................................................ 320/115
See application file for complete search history.

(56) References Cited

U.S. PATENT DOCUMENTS

| | | |
|---|---|---|
| 5,069,407 A | 12/1991 | Williams |
| 5,447,442 A | 9/1995 | Swart |
| 5,648,712 A | 7/1997 | Hahn |
| 5,742,149 A * | 4/1998 | Simpson ........................ 320/113 |
| 5,799,914 A | 9/1998 | Chivallier et al. |
| 5,988,572 A | 11/1999 | Chivallier et al. |
| 6,102,284 A | 8/2000 | Myers et al. |
| 6,400,560 B1 | 6/2002 | Chian |
| 6,716,058 B2 | 4/2004 | Youn |
| 6,752,299 B2 | 6/2004 | Shetler et al. |
| 7,112,096 B2 | 9/2006 | Moisevenko et al. |
| 7,116,554 B2 * | 10/2006 | Lee et al. ...................... 361/695 |
| 7,365,514 B2 * | 4/2008 | Tong .............................. 320/110 |

(Continued)

FOREIGN PATENT DOCUMENTS

| | | |
|---|---|---|
| DE | 4107995 A1 | 9/1992 |
| DE | 19609404 A1 | 9/1997 |

(Continued)

OTHER PUBLICATIONS

International Search Report and Written Opinion for related counterpart International Patent application No. PCT/US2010/025306 mailed on Jun. 14, 2010.

(Continued)

*Primary Examiner* — Yalkew Fantu
(74) *Attorney, Agent, or Firm* — Randi L. Karpinia; Michael J. Giannetta (57) ABSTRACT

The present disclosure includes an adapter and associated method of use for mobile unit (MU) charging and communication that enables multiple connector types to be utilized with a single charger or charging station. The adapter enables standardization of a connector scheme on newer MUs while maintaining compatibility with current or older MU devices. Specifically, the adapter resides between the MU and a charging device or station. The adapter may include various connector features mimicking connectors of various different MUs, thus allowing it to interface with a device of a different connector design. Advantageously, the adapter enables enterprises to deploy various cradles throughout facilities and achieves universal connections for a plurality of different MUs. In an exemplary embodiment, the adapter provides connectivity between various MUs and their associated cradles and a hook and pivoting latching system.

9 Claims, 5 Drawing Sheets

(56) References Cited

U.S. PATENT DOCUMENTS

| | | |
|---|---|---|
| 7,384,302 B2 | 6/2008 | Obata et al. |
| 7,510,428 B2 | 3/2009 | Obata et al. |
| 7,611,358 B2 | 11/2009 | Cox et al. |
| 7,722,388 B1 | 5/2010 | Michaeli et al. |
| 2006/0126243 A1* | 6/2006 | Cheng et al. .............. 361/62 |
| 2007/0002533 A1* | 1/2007 | Kogan et al. .............. 361/686 |

FOREIGN PATENT DOCUMENTS

| | | |
|---|---|---|
| DE | 10113905 A1 | 10/2002 |
| DE | 102004035871 A1 | 2/2006 |
| DE | 102006032624 A1 | 11/2007 |
| EP | 2020557 A2 | 2/2009 |
| WO | 2006002938 A1 | 1/2006 |
| WO | 2008055885 A1 | 5/2008 |

OTHER PUBLICATIONS

International Preliminary Report on Patentability and Written Opinion for related counterpart International Patent Application No. PCT/US2010/025306 mailed on Sep. 22, 2011.

Notice of Allowance mailed on Feb. 2, 2010 in related U.S. Appl. No. 12/402,107, Ben Michaeli, filed Mar. 11, 2009.

Non Final Office Action mailed on Dec. 24, 2009 in related U.S. Appl. No. 12/402,107, Ben Michaeli, filed Mar. 11, 2009.

Office Action mailed Aug. 22, 2012 in European Patent Application No. 1070729.9.

Office Action mailed Aug. 22, 2013 in Canadian Patent Application No. 2754929.

* cited by examiner

ADAPTER AND METHOD FOR MOBILE UNIT CHARGING AND COMMUNICATION

FIELD OF THE INVENTION

The present invention relates generally to a mobile unit charging adapter. More particularly, the present invention relates to an adapter and method of use for mobile unit charging and communication that enables multiple connector types to be utilized with a single charger and/or charging station.

BACKGROUND OF THE INVENTION

Conventionally, a facility may use a plurality of mobile units (MU) deployed therethrough. As described herein, MUs may include any mobile computing device such as, but not limited to, a cell phone a smart phone, a two-way radio, a bar code scanner, a digital camera, a radio frequency identification (RFID) scanner, mobile computer, and combinations thereof. Depending on a type of facility, the MUs may be provided to employees, customers, or both for a variety of conventional functionalities used by the employees, customers, or both. For example, in a warehouse environment, employees may use the MUs for inventory purposes. In another example, in a retail environment, customers may be provided the MUs to perform sales functionalities such as price checks, locating items, checking out, etc. Disadvantageously, the plurality of MUs used in the facility may require a high amount of maintenance. For example, updating all the MUs when upgraded software is used by the network or system requires that each MU receive a respective update. To this end, conventional technologies provide a cradle device in which the MU is inserted to recharge power as well as establish a connection with the network. In order to minimize an amount of space, the cradles may be aligned in rows and columns and mounted on a wall of the facility. However, because the cradle must provide a sufficient amount of surface area as well as the components to establish the connection that are sufficiently-strong to hold the MU, the cradles may require a larger amount of space than anticipated. Furthermore, different MUs typically include different connector types requiring a specific cradle for each MU type.

BRIEF SUMMARY OF THE INVENTION

In an exemplary embodiment, an adapter includes a body configured to receive one of a mobile unit or a charging cradle; a first connector disposed to the body and configured to electrically connect to the mobile unit or the charging cradle; and a member disposed to the body and comprising a second connector with electrical connections to the first connector, wherein the second connector is configured to electrically connect to an external device thereby providing electrical connectivity from the external device to the mobile unit or the charging cradle. The adapter may further include a locking member configured to connect to the member and to engage the member to the external device. The locking member may include one or more rails with a notch, wherein the one or more rails may be configured to engage openings in the member and the notch may be configured to engage a latch in the member thereby locking the locking member to the member. Optionally, the external device may include a charging station including a rail with a plurality of connectors disposed on the rail, and wherein the locking member may be configured to engage a recess on one of the plurality of connectors thereby locking the adapter in place on the one of the plurality of connectors. The body may include a rear wall, a bottom wall, side walls, and a front wall each of which collectively defines a body opening; and wherein the mobile unit or charging cradle may be received in the body opening. The front wall may be substantially shorter than the real wall, and wherein the side walls may be substantially equal height. The adapter may further include top walls disposed to the rear wall and the side walls, wherein the top walls may be configured to abut a top portion of the mobile unit or the charging cradle. The first connector may be disposed on the bottom wall, and wherein the first connector may be connected to the second connector through the bottom wall, the rear wall, and the member. The body and the first connector may be configured responsive to a particular type of mobile unit or charging cradle to interface the particular type to the external device for charging and communication. The first connector may be configured to connect to either the mobile unit or the charging cradle that in turn connects to the mobile unit.

In another exemplary embodiment, a mobile unit charging system includes a rail including a plurality of connectors each configured to electrically connect to a first type of mobile unit; and one or more adapters each supporting a different type of mobile unit or charging cradle from the first type of mobile unit; wherein each of the one or more adapters is configured to electrically connect to one of the plurality of connectors thereby providing electrical connection to a particular mobile unit or charging cradle disposed in the one or more adapters. Each of the one or more adapters may include a body configured to receive one of a mobile unit or a charging cradle, wherein the mobile unit may include a type different from the first type of mobile unit; a first connector disposed to the body and configured to electrically connect to the mobile unit or the charging cradle; and a member disposed to the body and including a second connector with electrical connections to the first connector, wherein the second connector may be configured to electrically connect to one of the plurality of connectors thereby providing electrical connectivity from the rail to the mobile unit or the charging cradle. Each of the one or more adapters may further include a locking member configured to connect to the member and to engage the member to the external device. The locking member may include one or more rails with a notch, wherein the one or more rails may be configured to engage openings in the member and the notch may be configured to engage a latch in the member thereby locking the locking member to the member. The locking member may be configured to engage a recess on one of the plurality of connectors thereby locking the adapter in place on the one of the plurality of connectors. The body may include a rear wall, a bottom wall, side walls, and a front wall each of which collectively defines a body opening; and wherein the mobile unit or charging cradle may be received in the body opening. The front wall may be substantially shorter than the real wall, and wherein the side walls may be substantially equal height. The mobile unit charging system may further include top walls disposed to the rear wall and the side walls, wherein the top walls may be configured to abut a top portion of the mobile unit or the charging cradle. The first connector may be disposed on the bottom wall, and wherein the first connector may be connected to the second connector through the bottom wall, the rear wall, and the member. The body and the first connector may be configured responsive to a particular type of mobile unit or charging cradle to interface the particular type to the rail for charging and communication.

In yet another exemplary embodiment, a method includes providing a charging rail for a first type of mobile unit, wherein the rail includes a plurality of connectors; placing an adapter over one of the plurality of connectors, wherein the adapter includes connectors interfacing a second type of mobile unit to the one of the plurality of connectors; locking the adapter over the one of the plurality of connectors with a locking member; and placing one of the second type of mobile units in the adapter for electrical communication to the charging rail.

BRIEF DESCRIPTION OF THE DRAWINGS

The present invention is illustrated and described herein with reference to the various drawings of exemplary embodiments, in which like reference numbers denote like method steps and/or system components, respectively, and in which.

DETAILED DESCRIPTION OF THE INVENTION

In various exemplary embodiments, the present invention includes an adapter and associated method of use for mobile unit (MU) charging and communication that enables multiple connector types to be utilized with a single charger or charging station. The adapter enables standardization of a connector scheme on newer MUs while maintaining compatibility with current or older MU devices. Specifically, the adapter resides between the MU and a charging device or station. The adapter may include various connector features mimicking connectors of various different MUs, thus allowing it to interface with a device of a different connector design. Advantageously, the adapter enables enterprises to deploy various cradles throughout facilities and achieves universal connections for a plurality of different MUs. In an exemplary embodiment, the adapter provides connectivity between various MUs and their associated cradles and a hook and pivoting latching system.

The present invention is described herein with respect to various products from Motorola including the MC3000, MC75 and MC55 MUs in the MC9500 universal charging cradle. Those of ordinary skill in the art will recognize the adapter of the present invention is contemplated for a wide range of devices including other Motorola devices (mobile devices, radios, mobile computers and data capture devices) as well as non-Motorola devices. For example, the present invention contemplates an adapter for providing charging and connectivity between different manufacturers of MUs. Advantageously, the present invention enables standardization on one connector scheme for future products while accommodating current and older devices in the "standard cradle."

The MC3000 is a handheld Mobile Computer in a brick configuration designed for applications and environments requiring high-quality data capture and high-performance real-time computing. The MC3000 provides bar code scanning and wireless mobile computing within retail stores, warehouses, on loading docks, postal routes or any other location. The MC75 is an Enterprise Digital Assistant (EDA) that provides 3.5G GSM HSDPA and 3G CDMA-EVDO Rev A support. The MC75 includes push-to-talk, integrated GPS with superior sensitivity and tracking capabilities, 1D and 2D bar code scanning, a high resolution two megapixel autofocus digital color camera, 802.11a/b/g wireless LAN (WLAN), Bluetooth and IrDA connectivity. The MC55 EDA is a small and light EDA with a 3.5-inch display, and the MC55 includes a cell phone, two-way radio, bar code scanner, digital camera and mobile computer. Finally, the MC9500 is an industrial class mobile computing device with a rugged design, more data capture options, true WAN technology independence and application flexibility through customer-swappable WAN subsystems and keypads, more processing power and a game-changing approach to battery and backroom management.

As described herein, the MUs may include any portable device such as, but not limited to, a mobile computer, a personal digital assistant (PDA), a laptop, a scanner, an RFID reader, an image capturing device, a pager, a cellular phone, etc. In general, MUs include various components, such as a display device, various data input arrangements, a data acquisition device, a transceiver, etc. MUs may include a housing that wholly houses internal components that may be susceptible to damage (e.g. an integrated circuit board, a transceiver, etc.) and/or at least partially houses external components {e.g. a display, a data input arrangement, an antenna, etc.). The housing may be manufactured with a predetermined shape to accommodate a charging device, a hook and pivot latching system, and the like. In particular, the housing may include connectors that allow the MU to connect to the charging device and the like. Connectors are conductive devices that connect electrical devices together. For MUs, connectors provide connection for charging (e.g. a battery) and for communication (e.g. software updates, data synchronization, etc.).

In an exemplary embodiment, the adapter has connector features that may connect to the MC9500 terminal at one side and connector features that may connect to another MU type on another side, thus allowing it to interface with an MU of a different connector design. For example, the adapter may be used to interface MUs of different connector design with an existing charging cradle, such as a hook and pivot latching system as described in commonly assigned U.S. patent application Ser. No. 12/402,107 filed Mar. 11, 2009 and entitled "SYSTEM FOR A MOBILE UNIT CHARGING AND CONNECTION," the contents of which are herein incorporate by reference in full. Another existing charging cradle may include the MC9500 universal charging cradle.

Figure 1:
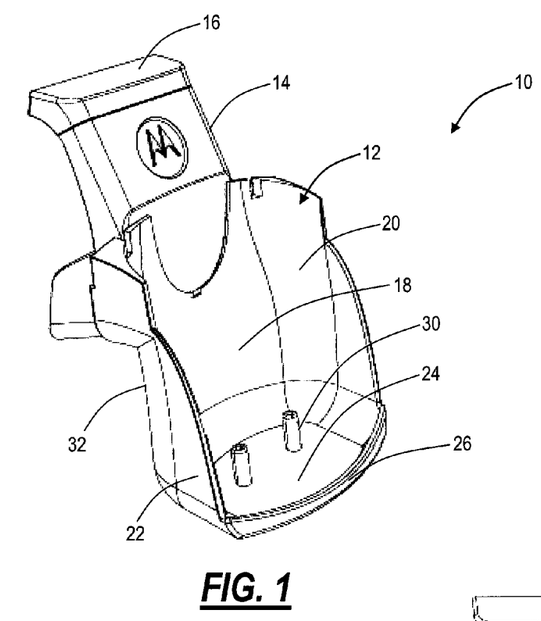
FIG. 1 is a side perspective view of an adapter of the present invention.
Figure 2:
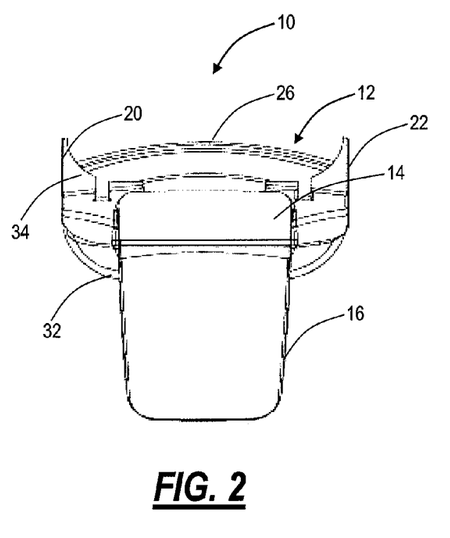
FIG. 2 is a top perspective view of the adapter of the present invention.
Figure 3:
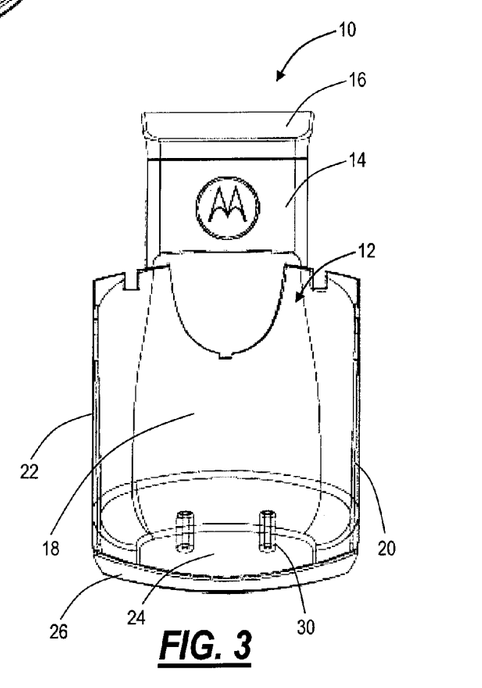
FIG. 3 is a front perspective view of the adapter of the present invention.

Referring to FIGS. 1-3, in an exemplary embodiment, perspective views illustrate an adapter 10 of the present invention. FIG. 1 illustrates a side perspective view, FIG. 2 illustrates a top perspective view, and FIG. 3 illustrates a front perspective view. The adapter 10 is configured to reside between an MU or a charging cradle of an MU and a separate charging station. Specifically, the adapter 10 enables compatibility between various MUs and/or their associated charging cradles and the charging station. The adapter 10 includes a body 12, an elongated member 14, and a locking member 16. The body 12 is adapted to receive either an MU or a cradle associated with an MU. The body 12 includes a rear wall 18, side walls 20, 22, a bottom wall 24, and a front wall 26 each of which define an interior of the body 12 for receiving the MU or the cradle. The rear wall 18 may be attached or integrally formed with the elongated member 14. The side walls 20, 22 are positioned apart from one another defining the interior of the body 12. The front wall 26 may be substantially lower than the rear wall 18 thus forming an opening to the interior of the body 12, and the front wall 26 may also be a lip. The bottom wall 24 is connected or disposed to each of the rear wall 18, the side walls 20, 22, and the front wall 26. Collectively, the components 18-26 may be interconnected, attached, or integrally formed, and the body 12 may include plastic or similar materials. Also, the shape of the body 12 is according to a particular MU or cradle supported by the adapter 10. Here, the body 12 is dimensioned and shaped to receive the particular MU or cradle, and those of ordinary skill in the art will recognize the body 12 may take any shape as required by the particular MU or cradle.

The bottom wall 24 includes connectors 30 adapted to create an electrical connection with the MU or the cradle. The connectors 30 extend from the bottom wall 24 to a rear portion of the elongated member 14 thus providing electrical connectivity from the adapter 10 to an external device. The connectors 30 also are designed for a particular MU or cradle, and those of ordinary skill in the art will recognize the connectors 30 may take any shape as required by the particular MU or cradle. In an exemplary embodiment, the adapter 10 is configured to operate with a hook and pivot latching system 50 (illustrated in FIGS. 4-6). Thus, the elongated member 14, the locking member 16, and a rear portion 32 of the body are shaped with a curvature to fit to and lock on the hook and pivot latching system 50. For example, as illustrated in FIG. 2, the locking member 16 extends outward from the elongated member 14 to connect to the hook and pivot latching system 50. Also, the body 12 may include a top wall 34 (shown in FIG. 2) that extends out slightly from the side walls 20, 22 and the rear wall 18 to maintain the MU or cradle within the interior of the body 12.

Figure 4:
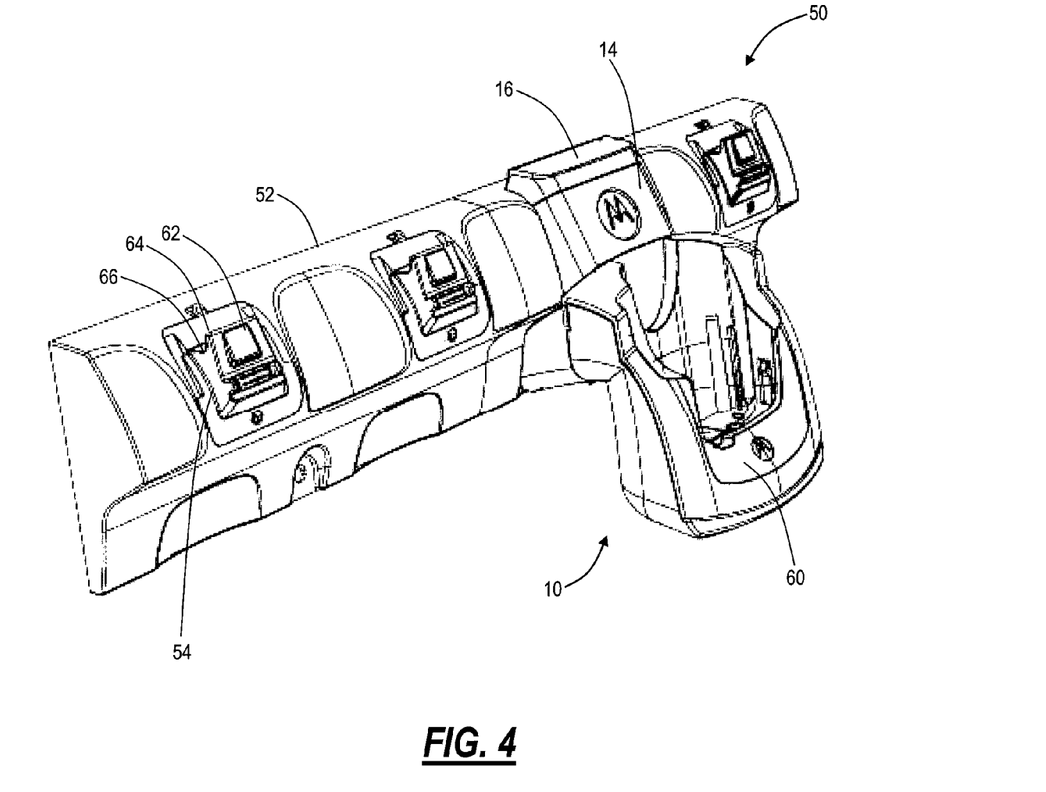
FIG. 4 is a perspective view of the adapter attached to a hook and pivot latching system.
Figure 5:
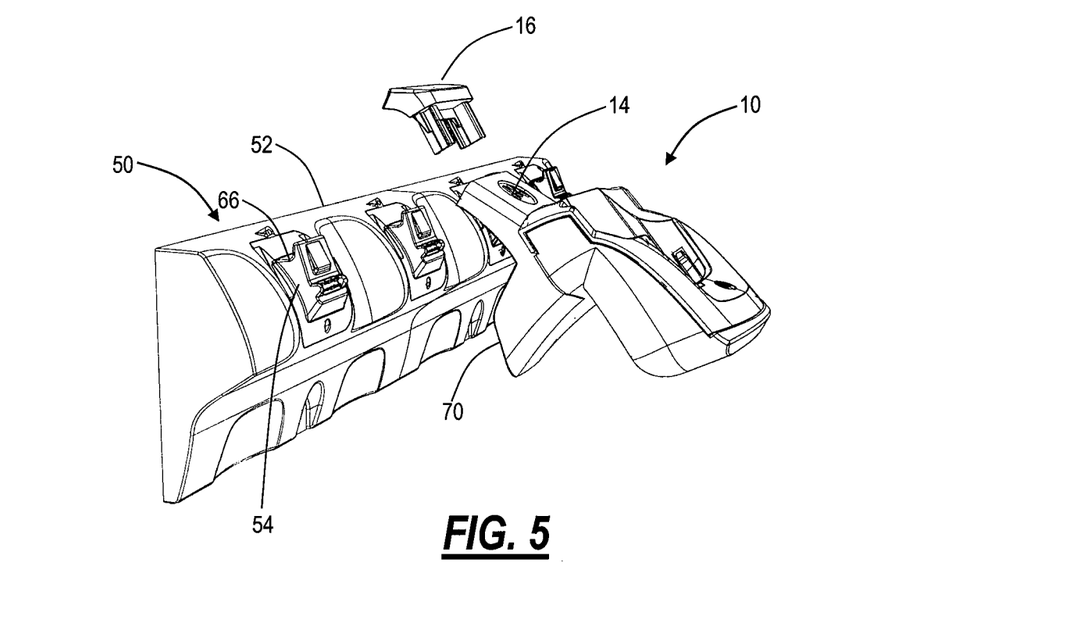
FIG. 5 is a perspective view of a first step in attaching the adapter to the hook and pivot latching system.
Figure 6:
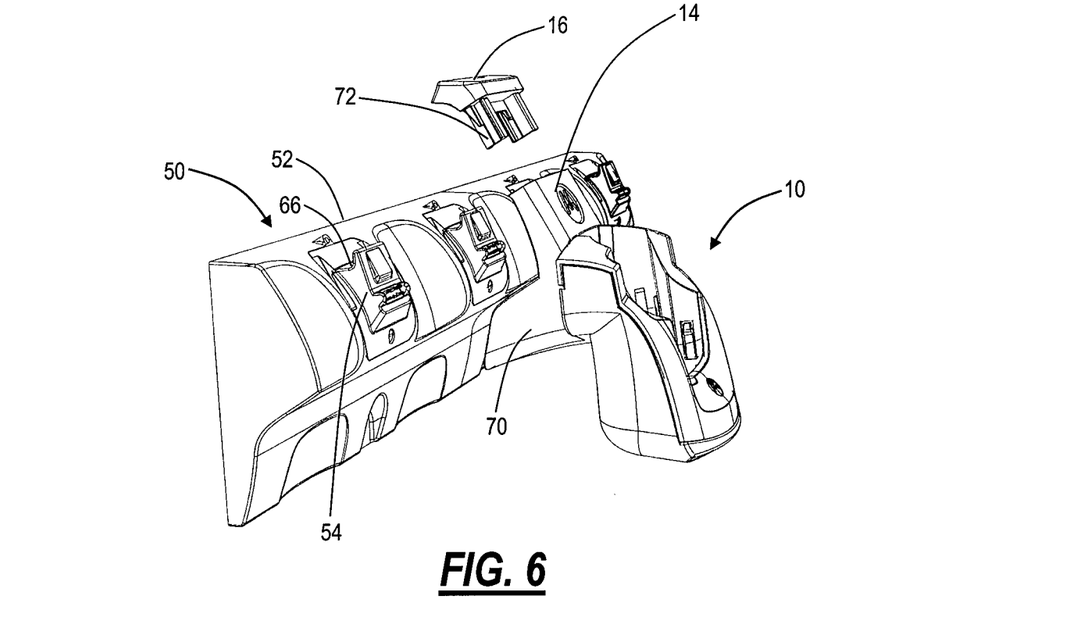
FIG. 6 is a perspective view of a second step in attaching the adapter to the hook and pivot latching system.

Referring to FIGS. 4-6, in an exemplary embodiment, the adapter 10 is illustrated interfacing to a hook and pivot latching system 50. The system 50 includes a rail 52 with a plurality of connectors 54. According to an exemplary embodiment of the present invention, the rail 52 may be for a retail facility, warehouse environment, or the like where a plurality of MUs are used for employees and/or customers. The rail 52 may provide a convenient location for the MUs or cradles for the MUs to be placed for charging and/or updating purposes. As illustrated in FIG. 4, the rail 52 may be placed side-by-side with each rail 52 providing four connectors 54 for MUs or cradles to be coupled. The rail 52 may be used in any configuration. For example, further rails 52 may be placed in a side-by-side manner. Alternatively, further rails 52 may be placed above and/or below the illustrated rails 52. Also, the rails 52 may be attached to a rack that supports the coupling of the rails 52 thereto. FIG. 4 illustrates the adapter 10 attached to the system 50 along with the adapter 10 including a cradle 60 disposed within the body 12. FIGS. 5 and 6 illustrate an exemplary operation of attaching the adapter 12 to the system 50.

The rail 52 includes the connectors 54 that couple with the attaching adapter 10. The connectors 54 are disposed and extend outward from the rail 52. Each of the connectors 54 include a contact 62 that is configured to make electrical contact with a corresponding contact on a rear portion of the elongated member 14 of the adapter 10. The electrical contact is utilized for power and communications to the MU and/or cradle from the rail 52. In an exemplary embodiment, the connectors 54 include a top portion 64 with a recess 66. The adapter 10 is configured to be attached to the recess 66 through the elongated member 14 and the locking member 16.

In general, the system 50 is configured to support a hook and pivot latching connection with MUs. As mentioned above, the system is described in commonly assigned U.S. patent application Ser. No. 12/402,107 filed Mar. 11, 2009 and entitled "SYSTEM FOR A MOBILE UNIT CHARGING AND CONNECTION." The system 50 supports a single type of MU connection. Advantageously, the adapter 10 enables the system 50 to support a plurality of different MU connections and cradles. This enables an enterprise to deploy the system 50 to support one specific type of MU connection going forward while maintaining backward compatibility with different MU connection types. Once connected to the system 50, the adapter 10 may receive an MU or a cradle. A user may simply plug the MU into the body 12 or into the cradle 60 for charging and communication.

FIGS. 5 and 6 illustrate an exemplary operation of attaching the adapter 10 to the system 50. In FIG. 5, the locking member 16 is detached from the adapter 10. With the locking member 16 detached, the adapter 10 may be connected to one of the connectors 54 on the rail 52 by rotating the adapter 10 in place over the connector 54. Here, the elongated member 14 and a rear portion 70 of the adapter 10 fit to the rail 52. During this process, the adapter 10 makes an electrical connection to the contact 62 on the connector 54. In FIG. 6, the adapter 10 is electrically connected to the connector 54, and the locking member 16 is connected to the adapter 10 thereby locking the adapter 10 in place on the rail. The locking member 16 may include rails 72 that are configured to slide into the elongated member 14 and lock in place, e.g. through a snap, latch, or the like. For example, the locking member 16 may include a notch or the like that is configured to engage the recess 66 thereby holding the adapter 10 in place on the rail 52.

Figure 7:
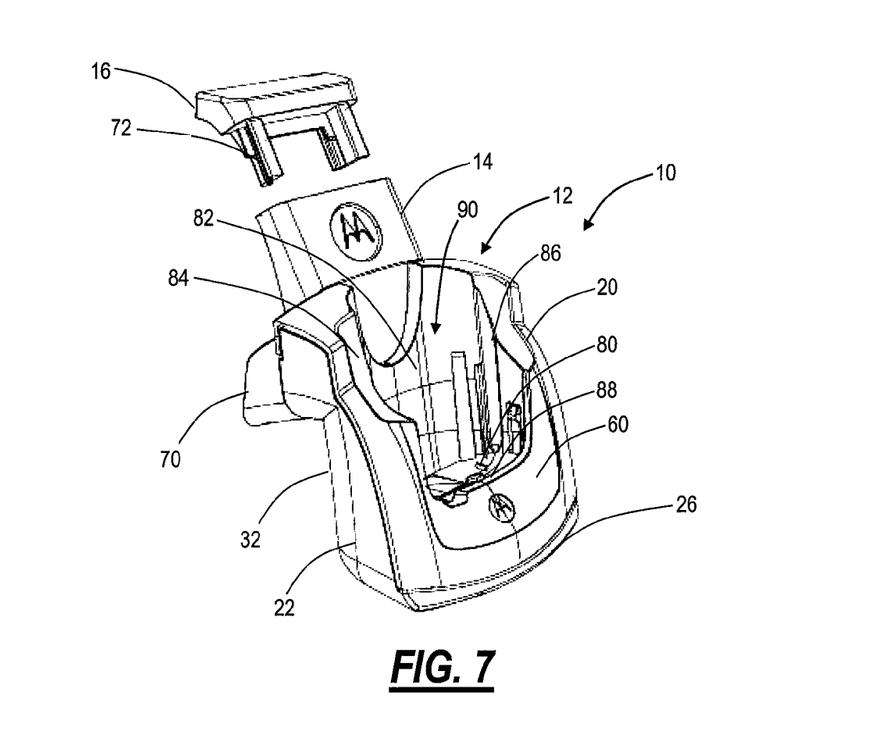
FIG. 7 is a perspective view of the adapter of the present invention with a cradle disposed in the body.
Figure 8:
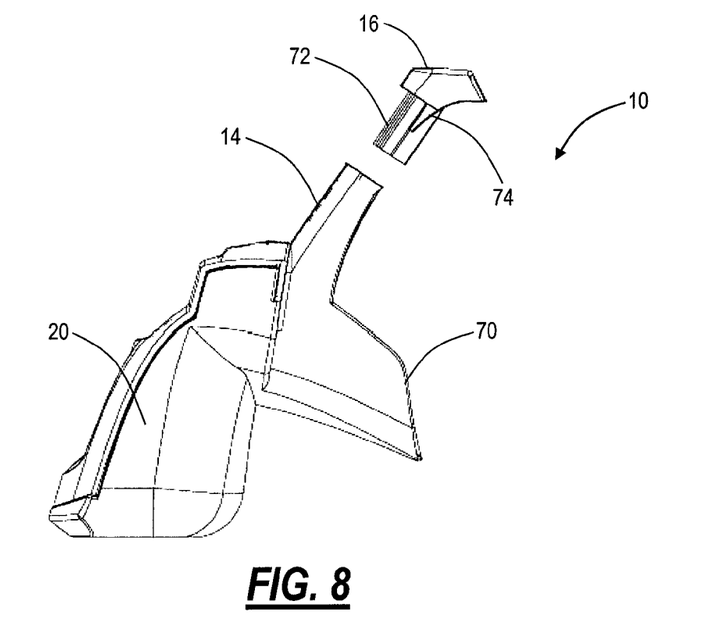
FIG. 8 is a side perspective view of the adapter of the present invention.

Referring to FIGS. 7 and 8, in an exemplary embodiments, the adapter 10 of the present invention is illustrated with a cradle 60 disposed in the body 12 and with the locking member 16 disengaged from the adapter 10. As described herein, the adapter 10 may be utilized to house an MU or alternatively a cradle that in turn houses an MU. Here, the adapter 10 is illustrated with the cradle 60, and the cradle 60 is configured to engage the connector 30 and connect to an MU through a connector 80 disposed in the cradle 60. Similar to the body 12, the cradle 60 includes a rear wall 82, side walls 84, 86, and a front wall 88 all collectively defining a cradle body 90. In general, the cradle 60 and the associated walls 82, 84, 86, 88 are formed to fit within the body 12 and conversely, the body 12 is fit to receive the cradle 60 and the associated walls 82, 84, 86, 88. Advantageously, the cradle 60 allows the adapter 10 to receive smaller MUs in addition to larger MUs (which would not require the cradle 60). Further, the cradle 60 may be utilized with the MU without the adapter 10 and the system 50. Here, the adapter 10 provides an efficient mechanism to support the MU with the cradle 60 enabling the MU to be compatible with various racks 52

In FIGS. 7 and 8, the locking member 16 is disengaged from the adapter 10. In an exemplary embodiment, the adapter 10 includes the body 12 and the elongated member 14 in a single device, i.e. integrally formed or physically connected. The locking member 16 is configured to engage the adapter 10 and to lock in place with the rails 72 engaging an interior of the elongated member 14 and notches 74 on the rails 72 configured to snap, lock, etc. in place in the adapter 10. The locking member 16 is removable to allow the adapter 10 to fit over the connector 54 on the rail 52. Once the adapter 10 is placed or fitted over the connector 54, the locking member 16 is engaged to snap, lock, etc. the adapter 10 in place on the rail 52.

Figure 9:
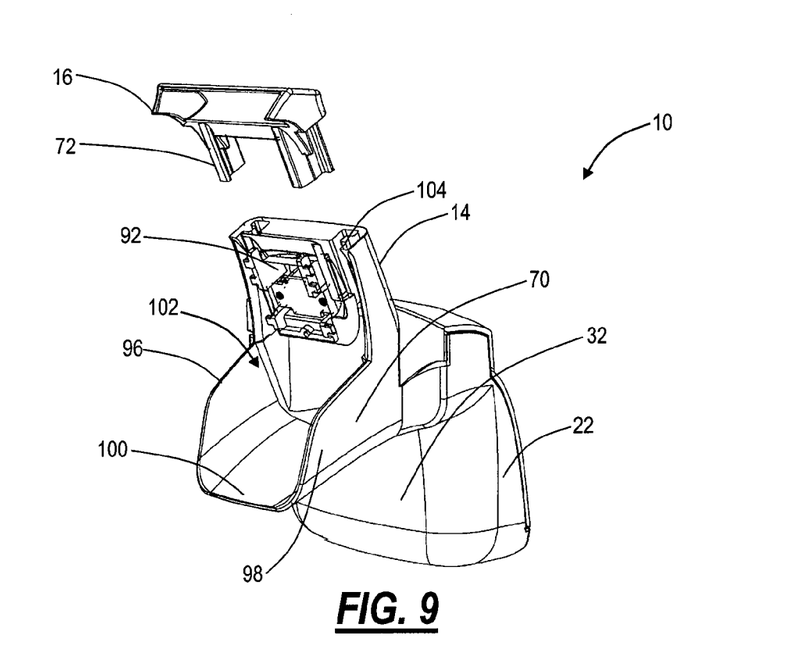
FIG. 9 is a rear perspective view of the adapter of the present invention with a locking member disengaged.
Figure 10:
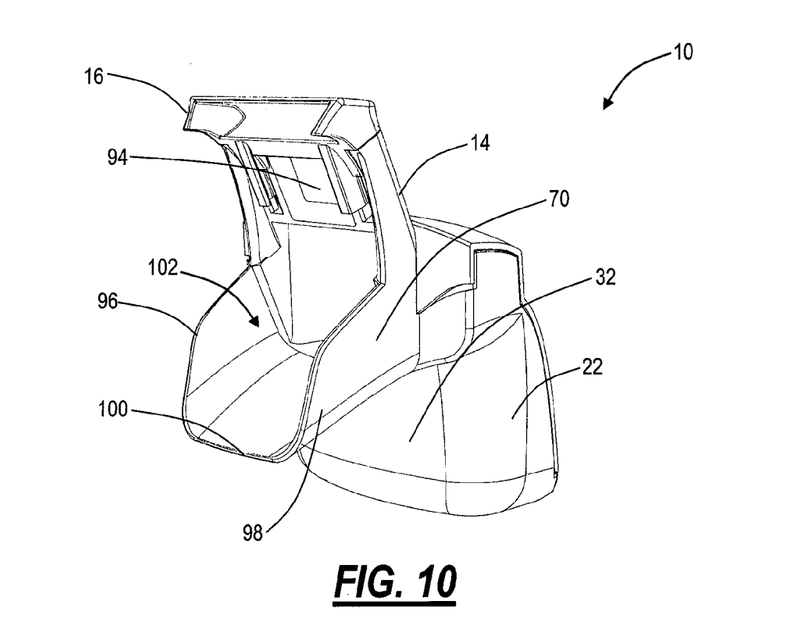
FIG. 10 is a rear perspective view of the adapter of the present invention with the locking member engaged.

Referring to FIGS. 9 and 10, in an exemplary embodiment, a rear portion of the adapter 10 is illustrated with the locking member 16 disengaged (FIG. 9) and engaged (FIG. 10). As described herein, the adapter 10 is configured to make an electrical connection with an external device, such as the connector 54 in the system 50. As such, the adapter 10 includes circuitry 92 (illustrated in FIG. 9) to provide electrical connectivity between the adapter 10, an external device, and an MU and/or cradle. This circuitry 92 provides power connectivity and data connectivity and connects through the adapter 10 to the connector 30. The adapter 10 further includes a contact 94 (illustrated in FIG. 10) disposed over the circuitry and configured to make contact with the external device.

Additionally in FIGS. 9 and 10, the rear portion 70 is illustrated with side walls 96, 98 and a bottom wall 100 defining an open portion 102. Here, the walls 96, 98, 100 are configured to abut the rail 52 in the system 50. The elongated member 14 includes openings 104 configured to receive the rails 72 on the locking member 16. The openings 104 include latches in their interior to catch the corresponding notches 74 on the rails 72 thereby locking the locking member 16 in place in the openings 104. Specifically, FIG. 9 illustrates the locking member 16 disengaged and lined up to position the rails 72 in the openings 104, and FIG. 10 illustrates the locking member 16 fully engaged in the openings 104. In an exemplary embodiment, the locking member 16 may be removed by apply a force to pull the rails 72 out of the openings 104 thereby disengaging the notches 74 from the latches in the openings 104.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A mobile unit charging system, comprising:
    a rail comprising a plurality of identical connectors each configured to electrically connect to a first type of mobile unit; and
    at least one adapter configured to receive one of a second type of mobile unit and a charging cradle for receiving a third type of mobile unit, the at least one adapter comprising:
        a body configured to receive the one of the second type of mobile unit and the charging cradle for receiving the third type of mobile unit, wherein the second type of mobile unit is different from the third type of mobile unit;
        a first connector disposed on the body and configured to electrically connect to the one of the second type of mobile unit and the charging cradle; and
        a member disposed on the body and comprising a second connector electrically connected to the first connector, wherein the second connector is configured to electrically connect to one of the plurality of identical connectors thereby providing electrical connectivity from the rail to the one of the second type of mobile unit and the charging cradle.

2. The mobile unit charging system of claim 1, wherein the at least one adapter further comprises:
    a locking member configured to connect to the member and to engage the member to a charging station.

3. The mobile unit charging system of claim 2, wherein the locking member comprises one or more rails comprising a notch, wherein the one or more rails are configured to engage openings in the member and the notch is configured to engage a latch in the member thereby locking the locking member to the member.

4. The mobile unit charging system of claim 2, wherein the locking member is configured to engage a recess on one of the plurality of identical connectors thereby locking the adapter in place on the one of the plurality of identical connectors.

5. The mobile unit charging system of claim 1, wherein the body comprises:
    a rear wall, a bottom wall, side walls, and a front wall each of which collectively defines a body opening; and
    wherein the one of the first mobile unit and the charging cradle is received in the body opening.

6. The mobile unit charging system of claim 5, wherein the front wall is substantially shorter than the real wall, and wherein the side walls are substantially equal height.

7. The mobile unit charging system of claim 5, further comprising top walls disposed to the rear wall and the side walls, wherein the top walls are configured to abut a top portion of the one of the first mobile unit and the charging cradle.

8. The mobile unit charging system of claim 5, wherein the first connector is disposed on the bottom wall, and wherein the first connector is connected to the second connector through the bottom wall, the rear wall, and the member.

9. The mobile unit charging system of claim 1, wherein the body and the first connector are configured to interface one of the first mobile unit and the charging cradle to the rail for charging and communication.

* * * * *